US012118138B2

(12) United States Patent
Grace et al.

(10) Patent No.: US 12,118,138 B2
(45) Date of Patent: Oct. 15, 2024

(54) VERGENCE AUTHENTICATION

(71) Applicant: Tectus Corporation, Saratoga, CA (US)

(72) Inventors: Michael Cabot Grace, Sunnyvale, CA (US); Bryan Jeffery Moles, Los Gatos, CA (US)

(73) Assignee: Tectus Corporation, Saratoga, CA (US)

( * ) Notice: Subject to any disclaimer, the term of this patent is extended or adjusted under 35 U.S.C. 154(b) by 333 days.

(21) Appl. No.: 17/671,448

(22) Filed: Feb. 14, 2022

(65) Prior Publication Data

US 2023/0259200 A1    Aug. 17, 2023

(51) Int. Cl.
| | |
|---|---|
| *G06F 3/01* | (2006.01) |
| *G06F 21/32* | (2013.01) |
| *H04W 12/06* | (2021.01) |
| *H04W 12/065* | (2021.01) |

(52) U.S. Cl.
CPC .............. *G06F 3/013* (2013.01); *G06F 21/32* (2013.01); *H04W 12/06* (2013.01); *H04W 12/065* (2021.01)

(58) Field of Classification Search
CPC ............ G06F 3/013; G06F 21/32; G06F 3/01; H04W 12/065; H04W 12/06
See application file for complete search history.

(56) References Cited

U.S. PATENT DOCUMENTS

| | | | |
|---|---|---|---|
| 6,449,309 B1 * | 9/2002 | Tabata | H04N 13/344 |
| | | | 348/E13.047 |
| 8,890,946 B2 | 11/2014 | Publicover | |
| 8,911,087 B2 | 12/2014 | Publicover | |
| 9,390,326 B2 | 7/2016 | Publicover | |
| 9,405,365 B2 | 8/2016 | Publicover | |
| 9,600,069 B2 | 3/2017 | Publicover | |
| 9,870,060 B2 | 1/2018 | Marggraff | |
| 10,025,379 B2 | 7/2018 | Drake | |
| 10,948,988 B1 | 3/2021 | Wiemer | |
| 2015/0338915 A1 | 11/2015 | Publicover | |
| 2016/0358181 A1 * | 12/2016 | Bradski | H04L 63/0861 |
| 2017/0123492 A1 | 5/2017 | Marggraff | |
| 2017/0285742 A1 | 10/2017 | Marggraff | |
| 2018/0275753 A1 | 9/2018 | Publicover | |
| 2019/0050643 A1 | 2/2019 | Ulman | |

(Continued)

OTHER PUBLICATIONS

Wikipedia, Parallax, https://en.wikipedia.org/w/index.php?title=Parallax&oldid=1061981106, 2021 (Year: 2021).*

(Continued)

*Primary Examiner* — Robert B Leung
*Assistant Examiner* — Howard H. Louie
(74) *Attorney, Agent, or Firm* — Lewis Roca Rothgerber Christie LLP (57) ABSTRACT

A system and method for authentication. In some embodiments, the method includes displaying a plurality of objects to a user's left eye and to the user's right eye, and monitoring the user's eye positions while the user looks at a subset of the displayed objects, one at a time. The method may further include comparing an angular offset for an object of the plurality of objects to a vergence measured for the user's eyes while the user looks at the object.

2 Claims, 8 Drawing Sheets

(56) References Cited

U.S. PATENT DOCUMENTS

2020/0117789 A1* 4/2020 Funk .................. G06F 21/316
2021/0290053 A1* 9/2021 Tran .................... A61B 3/113

OTHER PUBLICATIONS

Mukamal, High-Tech Contact Lenses That Go Beyond Correcting Vision, https://www.aao.org/eye-health/tips-prevention/smart-contact-lens-tech-beyond-vision-correction, 2020 (Year: 2020).*

Kumar, et al., Reducing Shoulder-surfing by Using Gaze-based Password Entry, Symposium On Usable Privacy and Security (SOUPS) 2007, Jul. 18-20, 2007, Pittsburgh, PA, USA.

Lohr, et al., Eye Know You Too: a Densenet Architecture for End-To-End Biometric Authentication Via Eye Movements, arXiv:2201.02110v1 [cs.CV] Jan. 5, 2022.

* cited by examiner $\theta \approx x/y$

VERGENCE AUTHENTICATION

FIELD

One or more aspects of embodiments according to the present disclosure relate to authentication, and more particularly to authentication based on a user's eye motion.

BACKGROUND

In various circumstances it may be desirable to secure access to a resource (e.g., to an asset) by requiring that a user be authenticated before the user is granted access. A method of authentication that requires the user to enter a password or personal identification number (PIN) may be vulnerable to a playback attack, in which an adversary observes successful access to the system by an authorized user, and the adversary then gains access by supplying the same password or PIN.

It is with respect to this general technical environment that aspects of the present disclosure are related.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
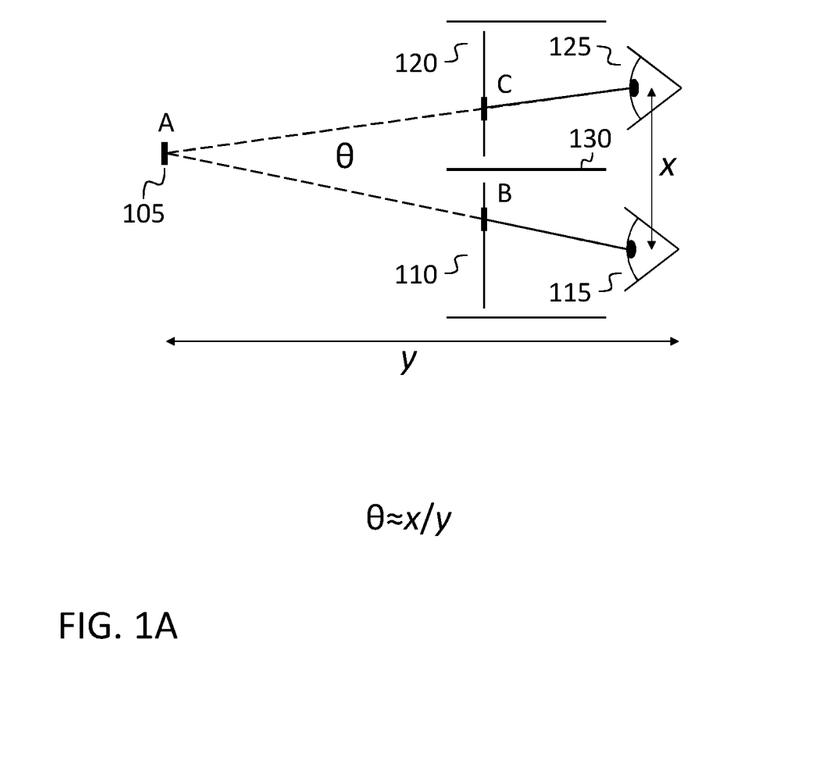
FIG. 1A is schematic top view of a binocular display, according to an embodiment of the present disclosure.

FIG. 1 is a schematic top view of a user viewing an object 105 using a binocular display. The binocular display includes a first display, or "left display" 110, generating images for the user's left eye 115 and a second display, or "right display" 120, generating images for the user's right eye 125. A partition 130 may be present to prevent light from the left display 110 from reaching the user's right eye 125 and vice versa. A system driving the display (or "display drive system") may send video signals to the left display 110 and to the right display 120, to display the object 105, to the user, at a position A, by rendering a first displayed image of the object 105 at position B on the left display 110, and a second displayed image of the object 105 at position C on the right display 120. If the object 105 appears, suitably rendered as shown, in both an image generated by the left display 110 and an image generated by the right display 120, then the user may perceive the object 105 at some apparent distance from the user.

The apparent distance of the object 105 from the user may be determined by an angular offset $\theta$, the angular offset being defined as the angle between (i) a first line between the user's right eye and the object as displayed in the right display and (ii) a second line, between the user's left eye and the object as displayed in the left display. When a user looks at the object, both of the user's eyes are aimed at the object, and the angle between the pointing directions of the user's eyes, which may be referred to as the "vergence" of the user (or of the user's eyes), may be equal to the angular offset for the object. The vergence (or the angular offset $\theta$), expressed in radians, may be approximately equal to the distance x between the user's pupils divided by the distance y to the object.

The display drive system may similarly display, to the user, other objects, e.g., of a plurality of simultaneously displayed objects. Each such object may be, for example, a simple shape, such as a sphere, a pyramid, or a cube, or it may be an alphabetical character or a numerical digit, or it may be a more complex object such as a machine or a plant or an animal. All characteristics of displayed objects, as described herein, are apparent characteristics and, as such, the qualifier "apparent" may be omitted. For example, the apparent height of an object may be referred simply as the height of the object, and the apparent distance between the user and an object may be referred to simply as the distance between the user and the object.

Figure 1B:
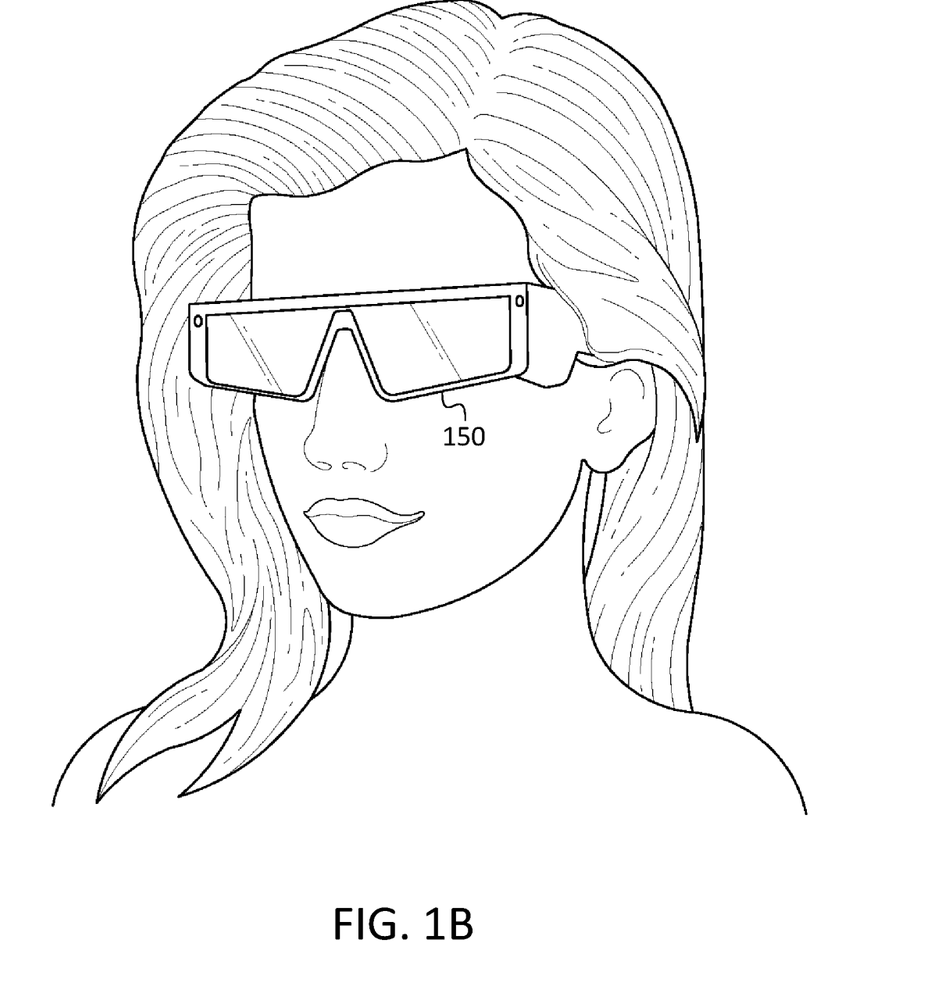
FIG. 1B is an illustration of a wearer wearing goggles including a binocular display, according to an embodiment of the present disclosure.
Figure 2A:
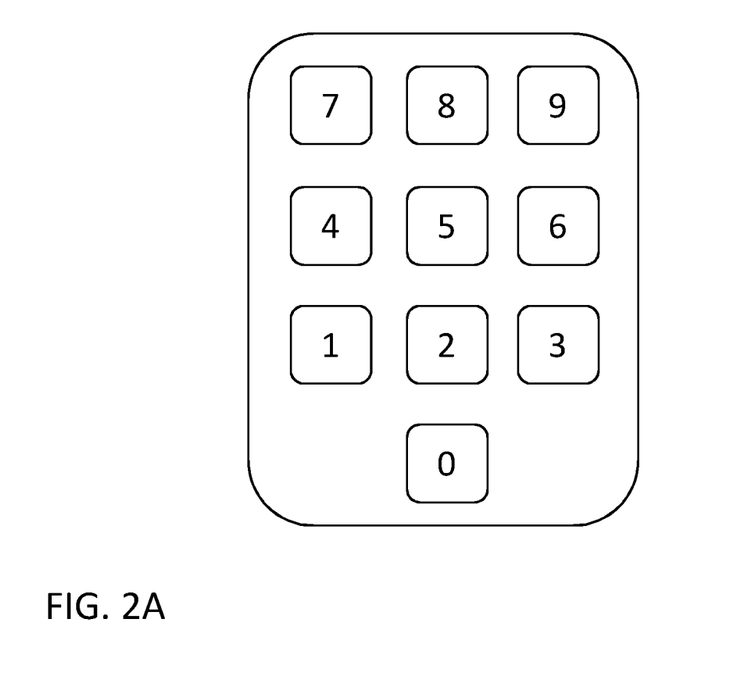
FIG. 2A is a drawing of a set of digits in a keypad layout, according to an embodiment of the present disclosure.

The binocular display may be fixed, e.g., secured to a wall of a building, or it may be worn by the user (e.g., installed in glasses or goggles, or, as discussed in further detail below, in contact lenses). FIG. 1B, for example, shows a wearer wearing goggles 150 including a binocular display. If the display drive system (or a system including the display drive system) is capable of monitoring the user's eye motion, security features may be implemented in the system; for example the system may implement challenge/response authentication, in which the system displays a prompt to the user, and the user must provide the correct response to that prompt in order to be granted access to a resource (e.g., to an asset) based on such authentication. Such security features may enable the system to confirm the identity of the user, or to confirm that the user is human (and not, e.g., a machine emulating a human). In some embodiments, for example, the system may display to the user a set of objects and the user may look at one or more of the objects in a particular predefined order. Looking, by the user, at the objects in the correct order may be used for authentication; knowledge, by the user, of the correct order, may operate, like knowledge of a password or personal identification number (PIN), as evidence that the user is who she or he claims to be. Upon successful authentication, the system may, as mentioned above, grant access to a resource, e.g., the system may allow the user to open a door or operate a computer or other device or machine. In some embodiments, the objects displayed to the user are the digits 0 through 9, and the user may look at a set of digits in a particular sequence to enter a PIN corresponding to the sequence. The digits may be displayed, for example, in a keypad layout as illustrated in FIG. 2A, in four rows and three columns, with the top row containing the digits 7, 8, and 9, the second row containing the digits 4, 5, and 6, the third row containing the digits 1, 2, and 3, and the bottom row containing the digit 0.

Figure 2B:
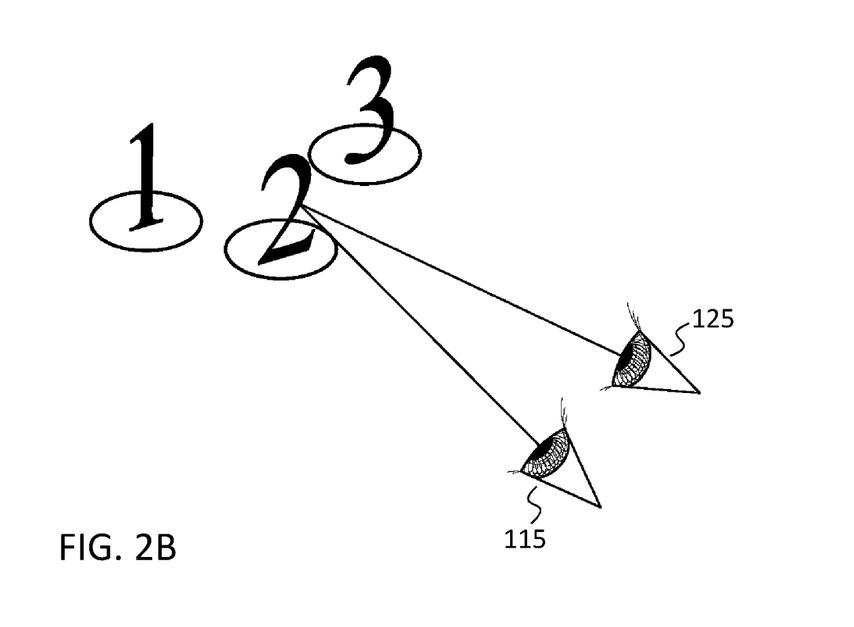
FIG. 2B is schematic illustration of three objects displayed to a user, according to an embodiment of the present disclosure.
Figure 2C:
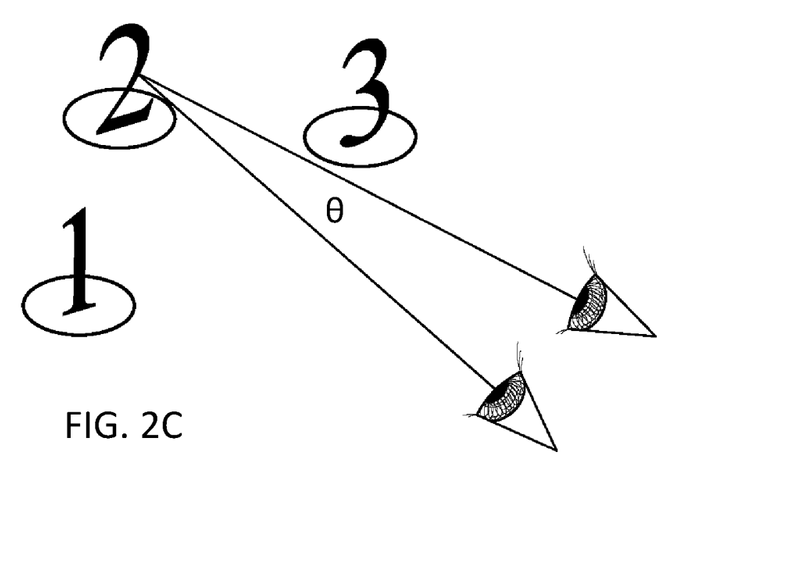
FIG. 2C is schematic illustration of three objects displayed to a user, according to an embodiment of the present disclosure.

In some embodiments, the display drive system may display the digits at different distances from the user. For example, the digit 2 may be displayed so as to appear nearer the user than the digits 1 and 3, as shown in FIG. 2B, or more distant than the digits 1 and 3, as shown in FIG. 2C. A disk is shown beneath each of the digits illustrated in FIGS. 2B and 2C (and in FIG. 2D, discussed below) to give the drawings an impression of depth; such disks need not be displayed to the user, in some embodiments. When the user looks, in sequence, at a set of digits displayed in this manner, the vergence of the user's eyes may adjust, from digit to digit, in a manner corresponding to the respective distances of the digits from the user. This adjustment of vergence may be sensed by the system such that a correct correspondence between the distance at which the objects are displayed and the user's vergence when looking at the objects may also be used as a factor in an authentication scheme. In the example described above, in which the system displays the digits 0-9 in a keypad layout, the system may display the digits, for each authentication attempt, with a different randomly selected distance from the user for each of the digits, and the user may be authenticated only if (i) the user looks at the correct subset of objects, in the correct order and (ii) the vergence matches the angular offset for each of the digits looked at by the user. As used herein, the vergence may be considered to "match" the angular offset if the difference between the vergence and the angular offset is less than a threshold (which may be set based on (i) the accuracy of the pointing angle sensors employed by the system and (ii) the typical eye-pointing accuracy of a human user). Such an approach may help to thwart a playback attack, in which an adversary surreptitiously records, on a first occasion, the user's eye motion during a successful authentication attempt and then plays back the recorded eye motion to the system on a second occasion. The use of randomly selected distances to the objects may (because the adjusting of the vergence may be done unconsciously by the user) be significantly more convenient for the user than alternatives for thwarting playback attacks, such as displaying the digits in a scrambled order.

Figure 2D:
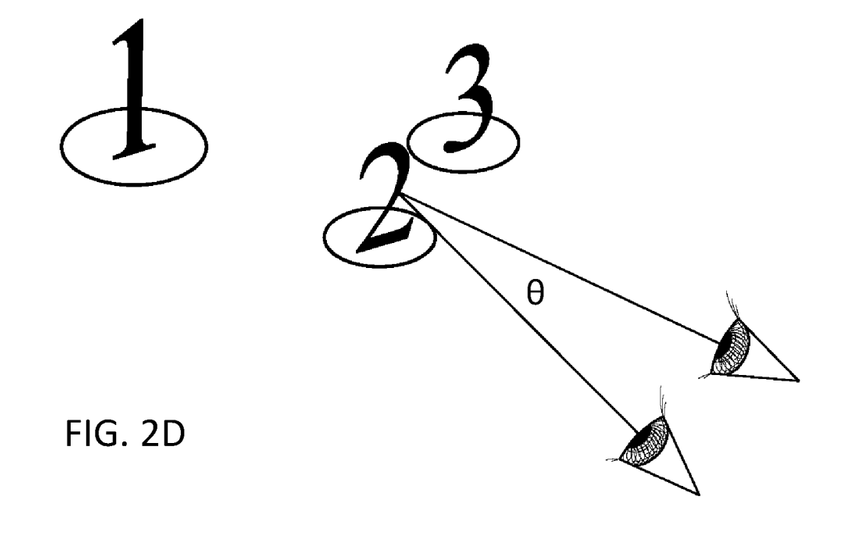
FIG. 2D is schematic illustration of three objects displayed to a user, according to an embodiment of the present disclosure.

In some embodiments, the size of each digit (i.e., the absolute size that the user perceives each digit to have, taking into account its apparent distance from the user) may be adjusted in proportion to its distance from the user, so that each digit has substantially the same angular size when viewed by the user. For example, the display drive system may render (i) a first digit that in three-dimensional space has a height of 10 cm and is at a distance of 50 cm from the user, and a second digit that has a height of 20 cm and is at a distance of 1 meter from the user. FIG. 2D illustrates this concept (from the perspective of a hypothetical viewer who is able to view, from above, the same objects as those seen by the user). In FIG. 2D the digit 1 is drawn larger because the user perceives it as larger and more distant than the digits 2 and 3 (although all of the digits may be rendered at the same size on the left display 110 and on the right display 120). In other embodiments, the sizes of the digits may be substantially the same, and digits that are more distant from the user may have a smaller angular extent.

Figure 2E:
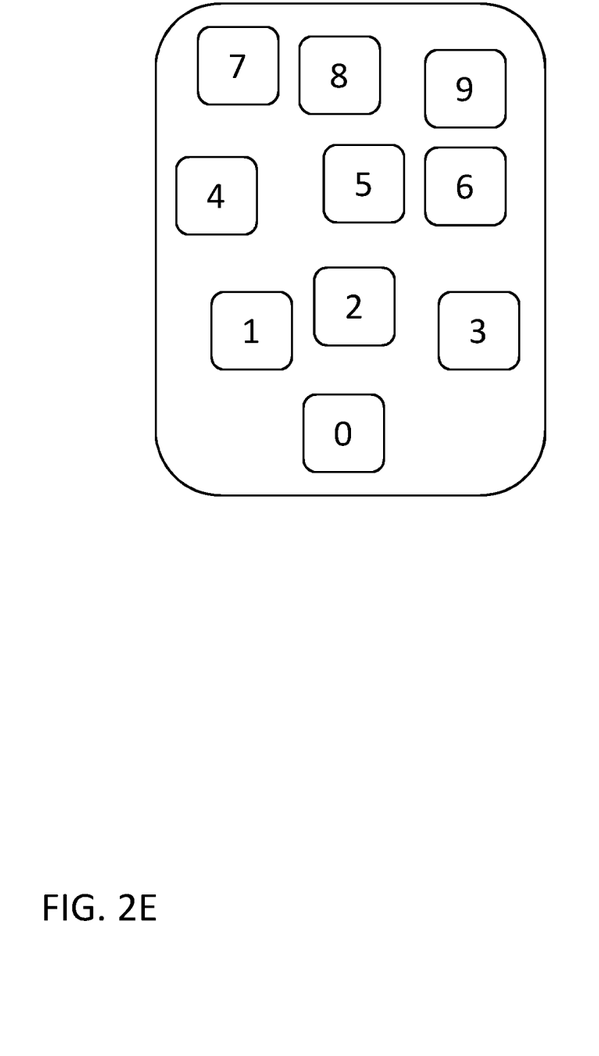
FIG. 2E is a drawing of a set of digits in a keypad layout with displaced positions, according to an embodiment of the present disclosure.

In some embodiments, other characteristic of the digits, other than distance from the user, may be randomly varied instead of, or in addition to, their distance from the user. For example, as illustrated in FIG. 2E, the position of each digit may be displaced from its nominal position (e.g., from its nominal position in a keypad layout) in a transverse direction, e.g., by a small offset, e.g., by an offset that is less than the lateral separation between adjacent digits. Such offsets (like the random variation in distance from the user described above) may make it unnecessary for the user to search for each digit (as the user might be required to do if the positions of the digits were scrambled), and such offsets may be detectable, like changes in vergence, by the system, and used for authentication. In general, the system may display the digits (or other objects) at positions that differ slightly (in any direction in three-dimensional space) from their nominal (or previously displayed) positions, and compare the position of any displayed object to the user's eye positions when the user looks at the object.

In some embodiments, the objects are, or include, objects that are not digits, e.g., simple two-dimensional shapes like a circle or a square, or three-dimensional shapes like a cube. In such an embodiment the system may otherwise work in a manner analogous to that described above for a system using digits, with the user looking at a set of objects in predefined order (e.g., looking at a cube, a circle, and a square, in order), and with the distance of each object from the user being randomly selected (and mirrored in the user's vergence) to thwart playback attacks. As used herein, an object displayed on one occasion may be considered to be the same object as an object displayed on another occasion if the user would regard the two objects to be the same. For example, if the digit 2 is displayed in a first position on a first occasion and in a second position on a second occasion, it may be described as one object (the digit 2) having been displayed in two different locations.

Other aspects of a user's eye motions may be used to authenticate a user, and also to maintain authentication of a user (e.g., to maintain confidence, some time after an explicit authentication, that the current user is the same user who performed the explicit authentication). For example, different users may train their eyes on a target at different rates, and when a user sees a new object, the user's eyes may briefly converge on a point closer to the user than the object, before looking at the object. Further, when a user looks at an object, the user's eyes may not point precisely at the object, but each eye may instead point in a direction that is sufficiently close to the object that the image of the object nonetheless falls on the fovea (the brain may then correct for the pointing errors in estimating the distance to the object). These characteristics may vary from user to user, and also may be poorly emulated by a machine (e.g., a machine used for a playback attack), and, as such, may be used for authentication. When the display is a non-obscuring display (a display that does not block the user's view of the user's surroundings), such as glasses, or (as discussed below) contact lenses, that superimpose the displayed images onto the user's view of the user's surroundings, the objects used to verify "liveness" (the continuous interaction, with the display, of a human user) may be objects generated by the display or physical objects in the user's surroundings. If the user has amblyopia, then the system may control for this characteristic, and authenticate the user even though the vergence does not match the angular offset (but instead matches a different vergence, which the system may predict based on the angular offset and the (e.g., previously measured) characteristics of the user's amblyopia). Moreover, the presence of amblyopia may also be used as a factor in an authentication scheme.

Figure 3A:
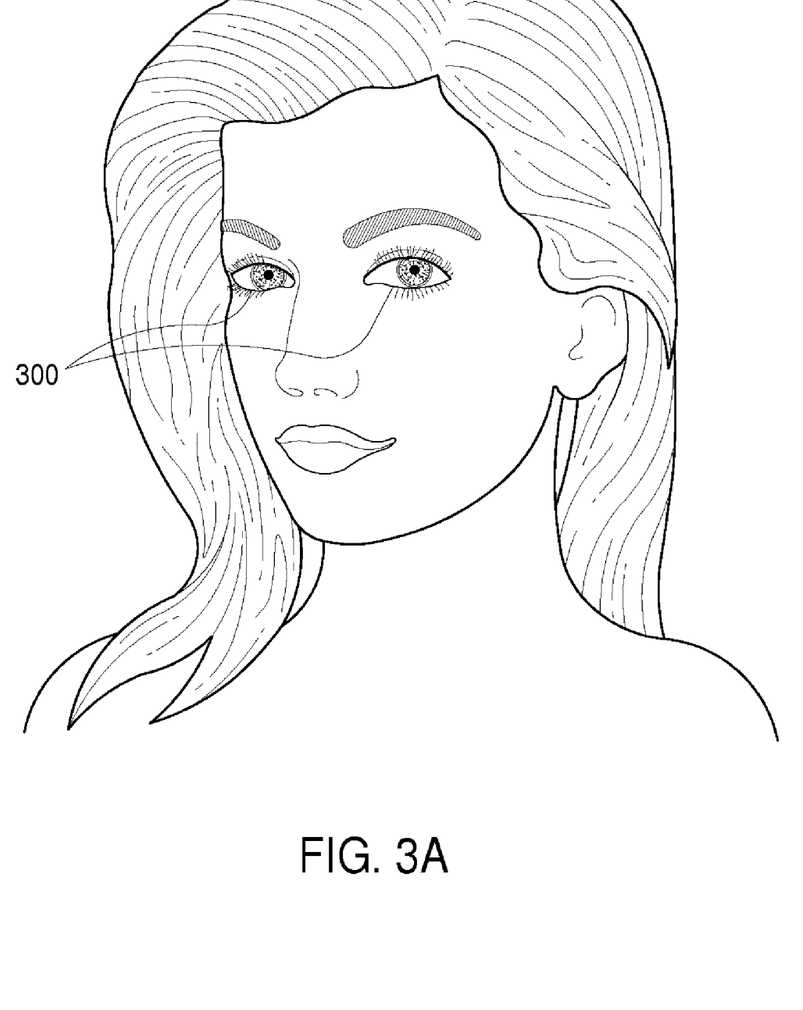
FIG. 3A is an illustration of a wearer wearing electronic contact lenses, according to an embodiment of the present disclosure.

In some embodiments, the binocular display includes two contact lenses, each with a respective display, which may be a projector for projecting images onto the retina. As used herein, a binocular display that is not a pair of contact lenses may be referred to as an "external" binocular display. FIG. 3A shows a user, or "wearer", wearing a pair of electronic contact lenses 300. Each electronic contact lens 300 may include various electronic components, such as a display, a forward-looking imager, motion sensors (such as a gyroscope, an accelerometer, and a magnetometer, the combination of which may be referred to as an inertial measurement unit (IMU)), a radio (e.g., a 5-GHz radio transceiver), a lens controller, batteries, and a power supply circuit. The electronic contact lens 300 may have various functions; for example, (i) it may project images or text onto the user's retina, causing the user to see the projected images (e.g., augmented reality video) or text superimposed on the user's surroundings (or only the projected images or text, if the user's eyes are closed), or (ii) it may assist a user with low vision, using the forward-looking imager.

Figure 3B:
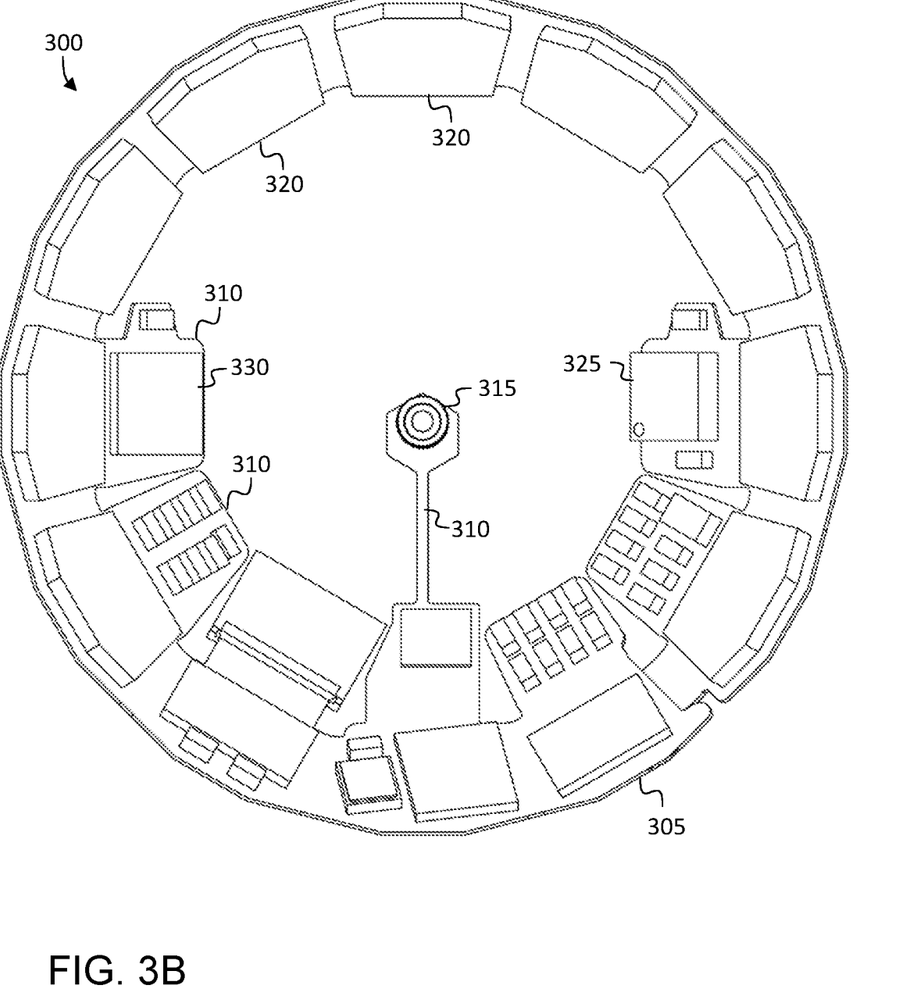
FIG. 3B is a posterior view of a circuit of an electronic contact lens, according to an embodiment of the present disclosure.

FIG. 3B shows a posterior view of a circuit for an electronic contact lens 300, in some embodiments. The circuit is fabricated as a flexible board 305, with a shape approximating a portion of a sphere, which may be included within the volume of a scleral contact lens. The circuit may be fabricated as an initially flat flexible board 305 (e.g., a plurality of components soldered to a flexible printed circuit) which may be coiled into the shape of a truncated cone with a plurality of extensions 310 for additional circuitry and for the display 315 (which may be a small projector (or "femtoprojector") configured to project light onto the user's retina). Except for the display 315 and the extension 310 supporting it, the circuit may be entirely outside of the area of the user's pupil. The electronic contact lens 300 may also include, for example, an energy storage device (e.g., one or more batteries 320), a radio (or "transceiver circuit") 325, a lens controller 330, an imager, sensors, and a power supply circuit.

Figure 3C:
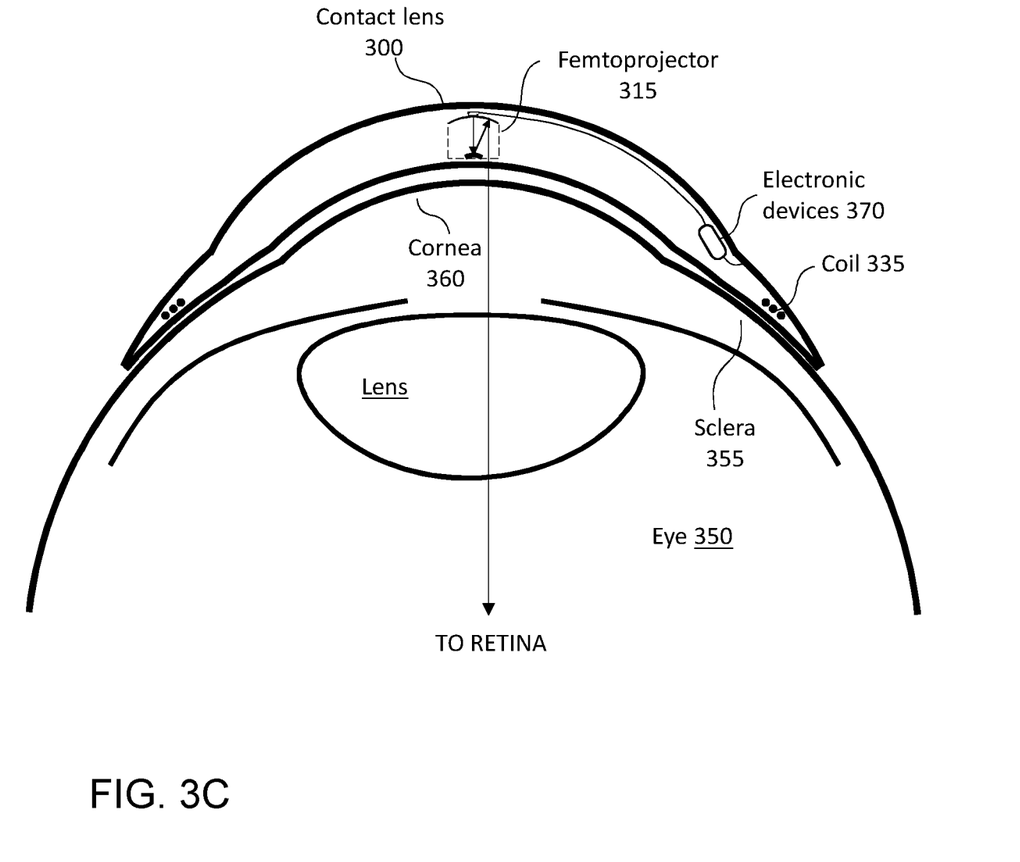
FIG. 3C is a schematic cross-sectional view of an electronic contact lens and an eye, according to an embodiment of the present disclosure.

FIG. 3C shows a cross-sectional view of an electronic contact lens 300 and the eye 350 of a user wearing the electronic contact lens 300. The electronic contact lens 300 touches the sclera 355, but vaults over the cornea 360. The electronic contact lens 300 is separated from the cornea 360 by a layer of tear fluid that is about 20-200 microns thick. As mentioned above, the electronic contact lens 300 may include various electronic devices 370, such as the radio 325, the lens controller 330, the imager, the sensors, and the power supply circuit.

When the binocular display is a pair of contact lenses, each with a respective display, the display system may be configured to compensate for motion of the user's eyes. For example, if the user's right eye turns to the left, the projector may adjust the position of the image of a displayed object on the retina so that the direction to the object (e.g., in a frame of reference anchored to the user's surroundings) remains constant. In this manner, the images supplied to the user's eyes by a contact lens may, like images supplied by an external display (e.g., a wall-mounted display or a display installed in glasses or goggles), show each object in a direction that is independent of the motion of the user's eyes. The orientation of each eye may be sensed in all three rotational degrees of freedom (e.g., by three gyroscopes in the contact lens), and the correction for eye motion may be performed in all three degrees of freedom (including roll, a degree of freedom in which the user's eyes may move when looking at an object that is both above or below the horizontal, and close to the user (so that the vergence is significant)).

Each of the contact lenses may be connected, e.g., by a wireless connection, to a relay accessory, which may be a user-carried or user-worn accessory, such as a mobile phone. The relay accessory may supplement the processing capabilities of the contact lenses, which may be limited because of constraints on volume, in the contact lens, for processing circuits and for batteries to power them. The relay accessory may also provide access (e.g., via the Internet) to various external services, e.g., sources of information that may be displayed to the user. In some embodiments, the relay accessory requires an explicit authentication from the user when the user first begins wearing the contact lenses, and thereafter if the liveness signal is lost during an interval that is sufficiently long that during the interval the user could have removed the contact lenses and another user begun wearing them. The resource to which the authentication method restricts access may be the contact lens system itself, or another resource (e.g., access to a building).

The detailed description set forth above in connection with the appended drawings is intended as a description of exemplary embodiments of a system and method for authentication provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

As used herein, "a portion of" something means "at least some of" the thing, and as such may mean less than all of, or all of, the thing. As such, "a portion of" a thing includes the entire thing as a special case, i.e., the entire thing is an example of a portion of the thing. Similarly, a subset of a set may be the entire set or a proper subset of the set. As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity. As used herein, when an action is taken "in response to" a first condition, the action may be taken solely in response to the first condition, or in response to the first condition and one or more other conditions. As used herein, comparing a first quantity and a second quantity includes comparing a function of the first quantity to a function of the second quantity.

Although exemplary embodiments of a system and method for authentication have been specifically described and illustrated herein, many modifications and variations will be apparent to those skilled in the art. Accordingly, it is to be understood that a system and method for authentication constructed according to principles of this disclosure may be embodied other than as specifically described herein. The invention is also defined in the following claims, and equivalents thereof.

What is claimed is:

1. A method for granting access to a machine, comprising:

displaying separately to a user's left eye and to the user's right eye, a plurality of numerical digits with an external binocular display system comprising a left display and a right display, wherein the digits are displayed in numerical order in a keypad layout, the digits appear at randomly selected distances, nearer digits appear larger than farther digits, and each digit is randomly displaced from a nominal position in the keypad layout by an offset that is less than a lateral separation between adjacent digits, the display system being capable of monitoring the user's eye motion and communicating with the machine;

monitoring the user's eye positions with the display system while the user looks at a subset of the displayed digits, one at a time and during the monitoring, for each digit:

comparing an angular offset to a vergence measured for the user's eyes while the user looks at the digit, wherein the angular offset is an angle between a first line between the user's left eye and the digit as displayed in the left display and a second line between the user's right eye and the digit as displayed in the right display, and the vergence is an angle between pointing directions of the user's left and right eyes;

determining whether or not the vergence corresponds to the distance at which the digit is displayed, determining whether or not the user looked at the digit in an order matching a predefined order of digits, and determining whether or not the user is a human and not a machine emulating a human;

repeating, twice or more, the displaying, monitoring, comparing and determining steps, each time with different randomly selected distances and displacements; and, granting the user access to the machine in response to the vergence matching the angular offset for each digit, the order matching the predefined order, and the user being human, during each of the two or more repetitions of the displaying, monitoring, comparing and determining steps.

2. The method of claim 1, wherein the displacements are in one or more directions in a plane.

* * * * *